United States Patent
Fiorillo (10) Patent No.: US 10,367,853 B2
(45) Date of Patent: Jul. 30, 2019

(54) METHOD AND ENTITY IN A LI SYSTEM FOR POSITIONING OF A TARGET CONNECTED TO A WI-FI NETWORK

(71) Applicant: TELEFONAKTIEBOLAGET LM ERICSSON (PUBL), Stockholm (SE)

(72) Inventor: Lorenzo Fiorillo, San Nicola la Strada (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/328,843

(22) PCT Filed: Jul. 25, 2014

(86) PCT No.: PCT/SE2014/050905
§ 371 (c)(1),
(2) Date: Jan. 24, 2017

(87) PCT Pub. No.: WO2016/013964
PCT Pub. Date: Jan. 28, 2016

(65) Prior Publication Data
US 2017/0223061 A1    Aug. 3, 2017

(51) Int. Cl.
*H04L 29/06* (2006.01)
*H04W 12/00* (2009.01)
(Continued)

(52) U.S. Cl.
CPC .......... *H04L 63/306* (2013.01); *H04L 63/304* (2013.01); *H04L 63/308* (2013.01);
(Continued)

(58) Field of Classification Search
CPC ......... H04W 64/00; H04W 4/02; H04W 4/22; H04W 84/12; H04W 12/06; H04W 12/08;
(Continued)

(56) References Cited

U.S. PATENT DOCUMENTS 8,989,177 B2 * 3/2015 Maione ................ H04L 63/306
370/352
9,179,436 B1 * 11/2015 Dhammawat .......... H04W 4/02
(Continued)

FOREIGN PATENT DOCUMENTS

WO     2014005652 A1     1/2014
WO  WO-2015/090436 A1 *  6/2015

OTHER PUBLICATIONS

International Search Report and Written Opinion dated March 16, 2015, in International Application No. PCT/SE2014/050905, 10 pages.
(Continued)

*Primary Examiner* — Magdi Elhag
(74) *Attorney, Agent, or Firm* — Sage Patent Group (57) ABSTRACT

The present invention relates to a mediation function node in a Lawful Intercept system and a method (S100) in a Lawful Intercept system for enabling a Law Enforcement Agency, LEA, to determine targets' positions. Said targets are connected to a WiFi network via an Access Point. The method comprises steps of: —receiving (S110) a RADIUS account message for a subscriber having been accepted access to the WiFi network; —retrieving (S120) from the received RADIUS account message RADIUS parameters corresponding to an Access Point Identifier and a Service Set Identifier, SSID, if the subscriber is a target; —sending (S130) together with a target identification the RADIUS parameters corresponding to the Access Point Identifier and the SSID to the LEA.

12 Claims, 6 Drawing Sheets

(51) Int. Cl.
  *H04W 64/00* (2009.01)
  *H04M 15/00* (2006.01)
  *H04W 84/12* (2009.01)
(52) U.S. Cl.
  CPC ......... *H04M 15/41* (2013.01); *H04W 12/007* (2019.01); *H04W 64/00* (2013.01); *H04W 84/12* (2013.01)
(58) Field of Classification Search
  CPC ..... H04W 8/24; H04W 12/007; H04W 84/24; H04L 63/30; H04L 63/302; H04L 63/304; H04L 63/306; H04L 63/308
  See application file for complete search history.

(56) References Cited

U.S. PATENT DOCUMENTS

| | | | | |
|---|---|---|---|---|
| 2004/0210524 | A1* | 10/2004 | Benenati | G06Q 20/102 705/40 |
| 2009/0041011 | A1 | 2/2009 | Sheppard | |
| 2009/0305719 | A1* | 12/2009 | Iovieno | H04W 12/02 455/456.1 |
| 2010/0130231 | A1* | 5/2010 | Fiorillo | H04W 12/02 455/456.3 |
| 2010/0316195 | A1* | 12/2010 | Di Serio | H04M 3/2281 379/32.01 |
| 2011/0191467 | A1* | 8/2011 | Imbimbo | H04L 29/12433 709/224 |
| 2012/0231819 | A1* | 9/2012 | Madigan | H04L 63/102 455/456.3 |
| 2013/0029687 | A1* | 1/2013 | Cooper | H04W 4/02 455/456.1 |
| 2013/0286869 | A1* | 10/2013 | Woelker | H04L 63/30 370/252 |
| 2014/0010228 | A1 | 1/2014 | Maione et al. | |
| 2014/0086144 | A1* | 3/2014 | Foti | H04L 61/106 370/328 |
| 2015/0049613 | A1* | 2/2015 | D'Amora | H04L 47/11 370/235 |
| 2015/0195771 | A1* | 7/2015 | Hurtta | H04W 8/10 370/338 |
| 2015/0341392 | A1* | 11/2015 | Marfia | H04L 63/306 370/259 |
| 2016/0134662 | A1* | 5/2016 | Van Phan | H04L 63/304 726/4 |
| 2016/0241600 | A1* | 8/2016 | Khan | H04L 63/306 |
| 2016/0344774 | A1* | 11/2016 | Westberg | H04L 63/306 |
| 2017/0063937 | A1* | 3/2017 | Westberg | H04L 63/306 |

OTHER PUBLICATIONS

"Lawful Interception (LI); Handover Interface and Service-Specific Details (SSD) for IP delivery; Part 3: Service-specific details for Internet access services", ETSI Draft; LI(12) P31009_ TS_102_ 232-3_V3_2_1_PART_3_SSD_for_Access_Services, European Telecommunications Standards Institute (ETSI), 650, Route des Lucioles; F-06921 Sophia-Antipolis; France, (Jun. 28, 2012), No. V3.2.1, pp. 1-50, XP014073742.

\* cited by examiner

METHOD AND ENTITY IN A LI SYSTEM FOR POSITIONING OF A TARGET CONNECTED TO A WI-FI NETWORK

CROSS REFERENCE TO RELATED APPLICATION(S)

This application is a 35 U.S.C. § 371 National Phase Entry Application from PCT/SE2014/050905, filed Jul. 25, 2014, designating the United States, the disclosure of which is incorporated herein in its entirety by reference.

TECHNICAL FIELD

The present technology relates to a method and an entity in a Lawful Interception network, especially for positioning of a target connected to a Wi-Fi network.

BACKGROUND

The present technology is related to Lawful Interception applications dealing with the positioning of the targets.

With the current technology there are many different methods for positioning of a target for Lawful Interception.

The accuracy of the positioning result goes from the centre of a GSM, UMTS, LTE cell to very narrow areas, in case Mobile Positioning Systems, MPSs, are involved in the positioning operation and the most accurate capabilities, e.g. GPS, are available.

Nevertheless, in case the MPS is not available in the mobile network, the most accurate positioning result is the CGI, Global Cell Identity, which means the geo coordinates of the centre of the cell serving the target.

Figure 1:
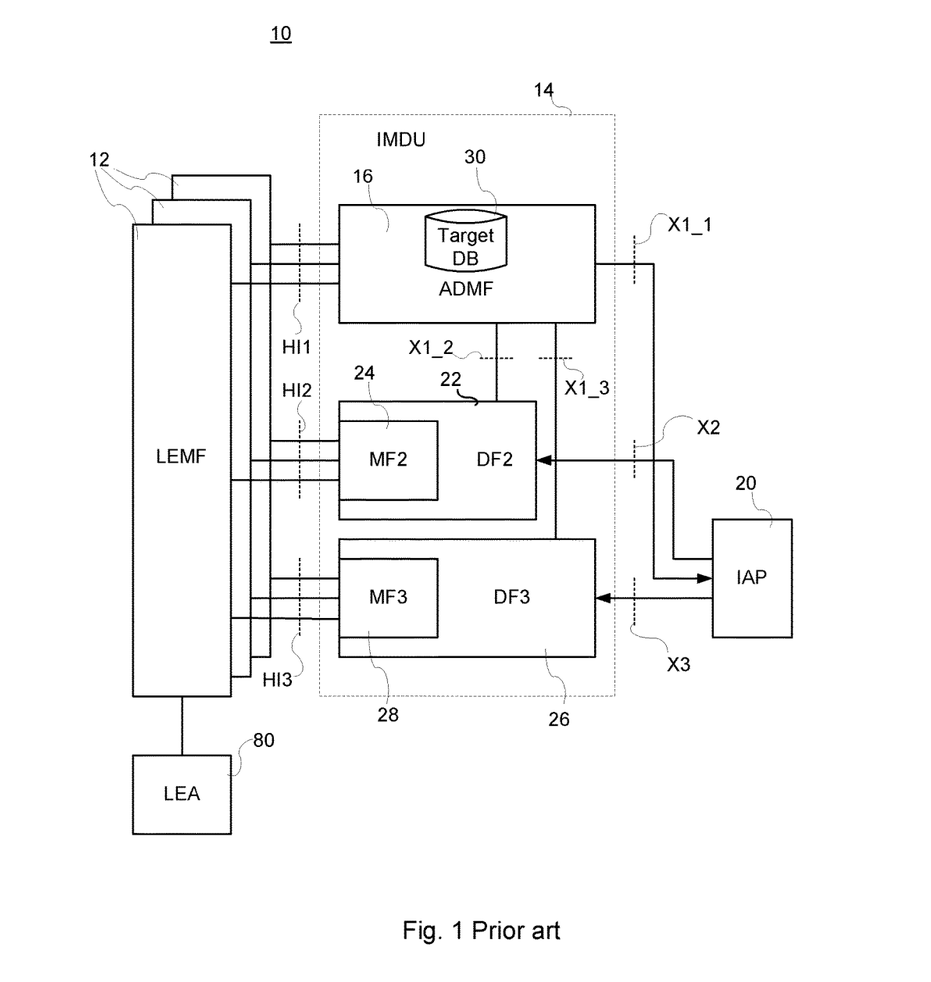
FIG. 1 is a block diagram of a LI system according to prior art.

FIG. 1 is a block diagram of an exemplary Lawful Interception, LI, system and network 10 according to prior art. Said system and network comprises a number of entities. The exemplary LI system comprises a Law Enforcement Management Function, LEMF, 12 for requesting LI services of the LI system and collecting the intercepted information of Intercepting Access Point, IAP, nodes in the system. The system shall provide access to the intercepted Content of Communications, CC, and Intercept Related Information, IRI, of a target and services related to the target on behalf of one or more Law Enforcement Agencies, LEAs, 80. An intercept request, also denoted Request for LI activation or addWarrant message, is sent through a first Handover Interface, HI1, located between the Law Enforcement Management Function 12 and an Intercept Mediation and Delivery Unit, IMDU, 14 comprising a Mediation Function, MF, and an Administration Function, ADMF, 16. Said Mediation Function 16 and Administration Function generate based on said received request a warrant comprising said one or more target identities, and sends said warrant towards an Intercepting Access Point, IAP, 20 via an interface denoted X1_1. The IAP 20 may be connected to a node of a network, e.g. the Internet, a 3 GSM (third Generation Mobile Communications System), etc., from which it intercepts said Content of Communications and Intercept Related Information of a mobile target. Said CC and IRI are network related data. As reference to the standard model, see references [1], [2] and [3], the content of communication is intercepted in the IAP network node and it is based upon duplication of target communication payload without modification. In reference [3], the interfaces HI1 and HI2 is specified in more detail. The IAP sends IRI raw data via an interface X2 to a Delivery Function for IRI reporting, DF2, 22 and a Mediation Function of IRI, MF2, 24 that generates and delivers to a collection functionality a standardized IRI report based on the received IRI report. Said standardized IRI report is sent over a standardized interface HI2 to the LEMF 12. The IAP 20 also sends CC raw data via an interface X3 to a Delivery Function for CC reporting, DF3, 26 and a Mediation Function of IRI, MF3, 28 which generates and delivers to a collection functionality a standardized CC report based on the received CC report. Said standardized CC report is sent over a standardized interface HI3 to the requesting LEMF 12. The ADMF entity 16 controls and communicates with the Mediation Function and Delivery Function for IRI reporting, MF2/DF2, via the interface X1_2 and the Mediation Function and Delivery Function for CC, MF3/DF3, via the interface X_13.

Together with the delivery functions it is used to hide from the third generation (3G) IAPs that there might be multiple activations by different Lawful Enforcement Agencies on the same target.

The HI2 and HI3-interfaces represent the interfaces between the LEA and two delivery functions. The delivery functions are used:
  to distribute the Intercept Related Information, IRI, to the relevant LEA(s) via HI2;
  to distribute the Content of Communication, CC, to the relevant LEA(s) via HI3.

According to known internet access services, all the IP streams related to a given target is intercepted and delivered as a whole session data flow regardless any service used within an interception session. If a LEA needs to access specific contents embedded in the whole session streams, it becomes necessary to do an appropriate post-processing of the intercepted data to find the data content of interest.

In the LI solution, the warrant data are stored in a source target database 30 of the mediation function 16 and, during the activation period, they are set on the IAPs 20 and stored in a target database in each IAP 20. The data are not stored in a persistent way in the target databases in the IAP's, i.e. they are lost in case of system shut-down.

One problem regarding target positioning is that in case the MPS is not available in the mobile network, there is no more precise positioning result available.

SUMMARY

One object with the following disclosure is to provide a method to be implemented in the Lawful Interception applications to provide the best accurate position of the target available in the network, in case the Mobile Positioning System is not available.

According to one aspect to achieve the above mentioned object, a method and embodiments thereof are provided. The method is performed in a Lawful Intercept system for enabling a Law Enforcement Agency, LEA, to determine targets' positions. Said targets are connected to a WiFi network via Access Points of the WiFi network. The method comprises steps of receiving a RADIUS account message for a subscriber having been accepted access to the WiFi network, retrieving from the received RADIUS account message RADIUS parameters corresponding to an Access Point Identifier and a Service Set Identifier, SSID, if the subscriber is a target, and sending together with a target identification the RADIUS parameters corresponding to the Access Point Identifier and the SSID to the LEA.

According to another aspect to achieve the above mentioned object, a mediation function entity and embodiments thereof are provided. The mediation function entity is situated in a Lawful Intercept system for enabling a Law Enforcement Agency, LEA, to determine targets' positions. Said targets are connected to a WiFi network via Access Points. The mediation function node comprises a communication interface and a processing unit. The processing unit is adapted to receive RADIUS account message for a subscriber having been accepted access to the WiFi network, retrieve from the received RADIUS account message RADIUS parameters corresponding to an Access Point Identifier and a Service Set Identifier, SSID, if the subscriber is a target, and to send together with a target identification the RADIUS parameters corresponding to the Access Point Identifier and the SSID to the LEA.

One advantage with the above methods and mediation function is that the proposed solution is not requiring any change in the Interception Access Points of the LI systems, the functionality is fully allocated in the LI System which exploits standard mechanisms.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present proposed solution and technique. However, it will be apparent to one skilled in the art that the present proposed solution and technique may be practiced in other embodiments that depart from these specific details. In other instances, detailed descriptions of well-known methods, devices, and circuits are omitted so as not to obscure the description of the present proposed solution and technique with unnecessary detail.

In the last 10 years, the radio technology for the mobile networks has evolved from GSM, UMTS, to the current LTE radio access.

The different mobile networks are more and more integrated, subscribers can seamless move from a network to another, e.g. can be connected to a CS network and at the same time access a PS network by means of different access points.

Very often the LEAs receive positioning information limited to the CGI, which are not considered enough accurate by the LEA.

The proposal is to leverage the situations when the target moving around is attached to a Wi-Fi Access Point, AP. Such cases will be more and more frequent, especially in the city centers of large towns.

A Wi-Fi AP may cover an area, which is smaller than a GSM, UMTS, LTE cell area.

The herein proposed solution is that the LI application retrieves the AP identifier where the target is connected and delivers this information to the LEA. Since the Access Point is serving an area much more limited compared to a GSM, UMTS, LTE cell area, it will result in a much more accurate positioning of the target.

There are different methods for authenticating a subscriber using a WiFi network access, some of the most common are: sim/u-sim based authentication, TLS/TTLS authentication, web portal authentication.

For all of them the RADIUS server is involved and it is possible to configure the RADIUS accounting interface so that when the network access is granted to a subscriber, an Accounting-Request message is sent to the RADIUS server. The Accounting interface can be configured to include in the Accounting-Request message, the Access Point identifier, the VLAN, the SSID. The SSID is the Service Set Identifier, which is the unique identification of the WiFi network.

The proposal is to enhance Lawful Interception for Broadband networks to include the retrieval of the information relevant for identifying the target position:

1. The LI system registers to receive the RADIUS accounting messages for all the subscribers in the network; this does not need to be a secure interface, since it is not transporting sensitive information, e.g. target identities;
2. The LI system discards all the messages that are not related to target of interception, while for the ones where the subscriber is matching with a target, the system retrieves the Radius parameters which correspond to the Access Point identifier and the SSID; and
3. Prepare an IRI for conveying such information to the LEA, over the Handover Interface.

Figure 2:
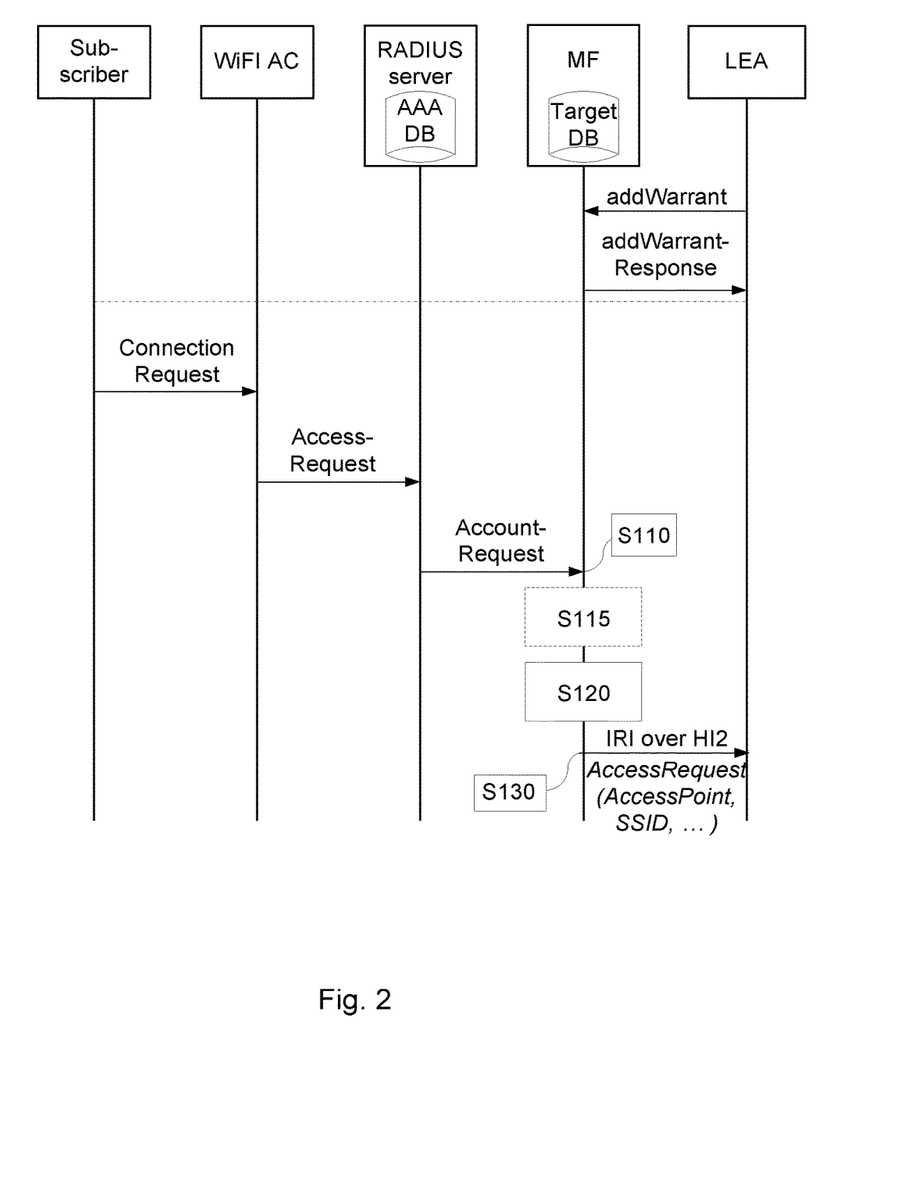
FIG. 2 is a signalling scheme illustrating activities and actions of different participants and system nodes when determining a position of a target.

FIG. 2 is a signalling scheme illustrating activities and actions of different participants and system nodes when determining a position of a target according to the proposed method.

With reference to FIGS. 1 (prior art) and 2, it is first taught how a subscriber is identified as a target in a target database. For enabling the LI system to intercept the communication of a subscriber of interest, i.e. a target, the LEA sends an addWarrant message to the mediation function MF, which registers the new target into a target database and returns a addWarrant response to the LEA. The warrant data are stored in a source target database 30 of the mediation function 16.

In the LI solution, the warrant data are stored in a source target database 30 of the mediation function 16 comprising the Administration Function, ADMF, and, during the activation period, they are set on the IAPs 20 and stored in a target database in each IAP 20. The data are not stored in a persistent way in the target databases in the IAP's, i.e. they are lost in case of system shut-down.

When a subscriber uses his or her user equipment, UE, to get access to a WiFi network and system, the UE sends a connection request. The request is received by a close Access Point, AP, of the WiFi network. During the access process between the UE and the WiFi network, an authentication of the subscriber is performed. The WiFi system sends an Accounting-Request message to a node comprising a RADIUS server for performing the authentication test. The RADIUS server comprises an AAA database, AAA DB, comprising information about an operator's subscribers. AAA commonly stands for authentication, authorization and accounting. It refers to a security architecture for distributed systems for controlling which users are allowed access to which services, and tracking which resources they have used. Two network protocols providing this functionality are particularly popular: the RADIUS protocol, and its newer Diameter counterpart. Authentication refers to the process where an entity's identity is authenticated, typically by providing evidence that it holds a specific digital identity an identifier and the corresponding credentials. Examples of types of credentials are passwords, one-time tokens, digital certificates, digital signatures and phone numbers. As the LI system has registered to receive the RADIUS accounting messages for all the subscribers in the network, said Accounting-Request message is forwarded to the mediation functionality, MF, node of the LI system. The node is configured to support a method S100 as proposed herein for enabling the determination of targets' positions. The MF is adapted to perform steps S100, S120 and S130, and optionally step S115. The method S100 and an embodiment thereof is discussed and illustrated in this disclosure with reference to FIGS. 3 and 4. The method implies that the LI system discards all the account messages that are not related to target of interception by means of the target database, target DB, while for the ones where the subscriber is matching with a target, the system retrieves the Radius parameters which correspond to the Access Point identifier and the Service Set Identifier, SSID, retrieved from the RADIUS accounting messages when a subscriber/target connects to the WiFi network. Further, the MF prepare an IRI for conveying such information to the LEA together with a target identification, over the Handover Interface HI2, in an AccessRequest field of the IRI.

The proposed method and an embodiment thereof for enabling determination of targets' positions will hereafter be described with reference to FIGS. 3 and 4, respectively.

Figure 3:
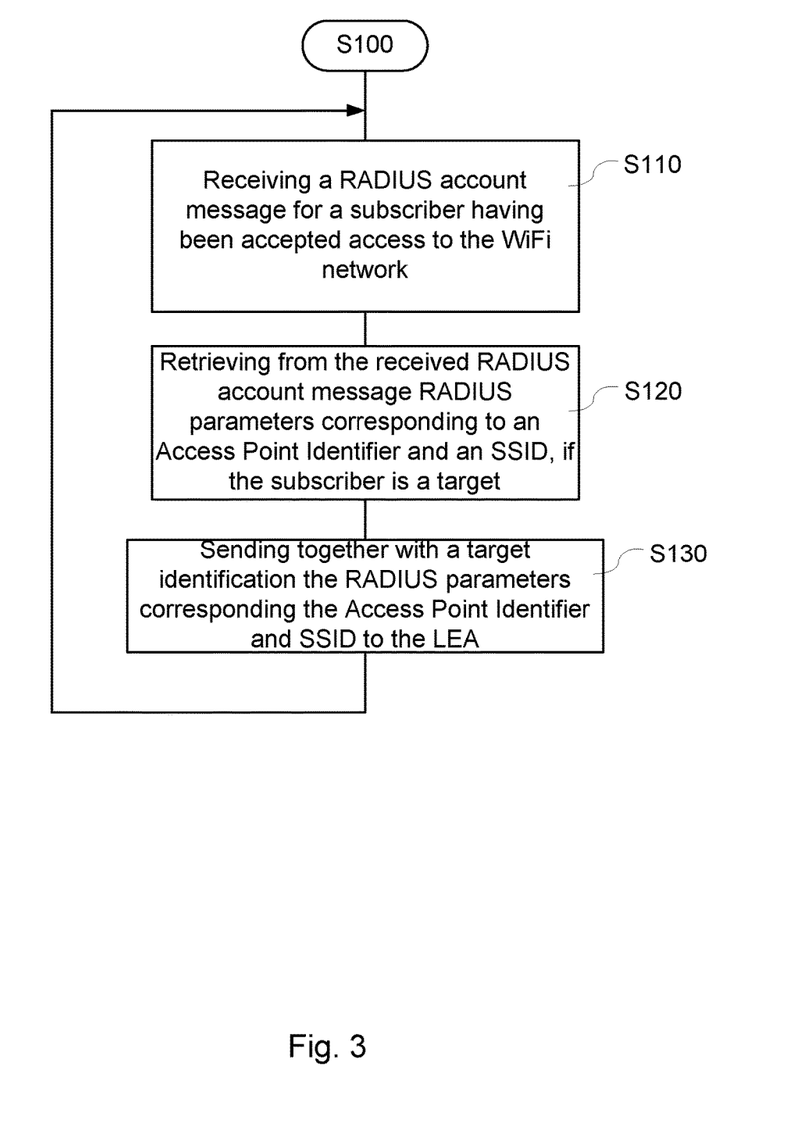
FIG. 3 is a flowchart illustrating a method for enabling targets' positions.

FIG. 3 is a flowchart illustrating a method S100 for enabling targets' positions.

The method S100 is performed in a mediation function MF entity of the an Intercept Mediation and Delivery Unit, IMDU, in a Lawful Intercept system, and the method enables a Law Enforcement Agency, LEA, to determine targets' positions. Said targets are connected to a WiFi network via an Access Point. The method comprises the steps of:

S110:—receiving RADIUS account message for a subscriber having been accepted access to the WiFi network;

S120:—retrieving from the received RADIUS account message RADIUS parameters corresponding to an Access Point Identifier and a Service Set Identifier, SSID, if the subscriber is a target;

S130:—sending together with a target identification the RADIUS parameters corresponding to the Access Point Identifier and the SSID to the LEA.

When the LEA has received the RADIUS parameters, the LEA is able to determine the geographical position by means of the received RADIUS parameter values. The Access Point Id is an identifier defined and known in the Telecom Operator domain of the system. The Telecom Operator is able to convert this into a real position, as it is done by means of CGM CGI. This could also be a manual process: the LEA asks the operator to provide the position where the given Access Point is placed: street XY number Z, or $3^{rd}$ floor, east side of the building W, . . . .

Figure 4:
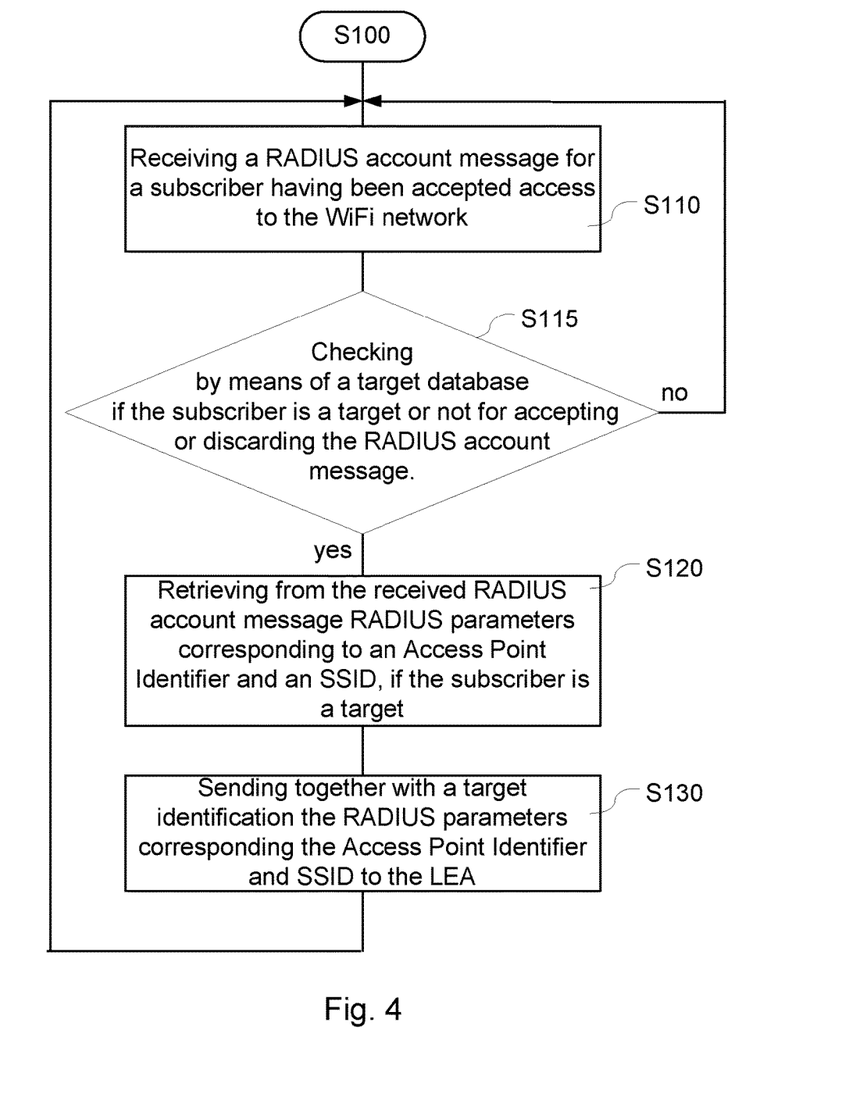
FIG. 4 is a flowchart illustrating an embodiment of the method for enabling targets' positions.

FIG. 4 is a flowchart illustrating an embodiment of the method S100 for enabling targets' positions.

In an embodiment of the above describe method S100, the method further comprises step S115:

checking by means of a target database if the subscriber is a target or not for accepting or discarding the RADIUS account message.

If the subscriber is identified in the target database, yes, the RADIUS account message is accepted and the method continues with the next step S120, wherein the RADIUS parameters are retrieved. If the subscriber is NOT identified in the target database, no, the method returns directly to step S110 and waits for a new RADIUS account message to be received.

The above proposed method and embodiments thereof may be implemented in an Intercept Mediation and Delivery Unit, IMDU, block 300 as mediation function(-ality) node MF comprising a Deliver function in a LI system. Said implementations are hereafter presented and illustrated with reference to FIGS. 5, 6 and 7.

The method and embodiments thereof may be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the described method and embodiments thereof may be performed by a programmable processor executing a program of instructions to perform functions of the LI system by operating on input data and generating output.

The method and its embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

Figure 5:
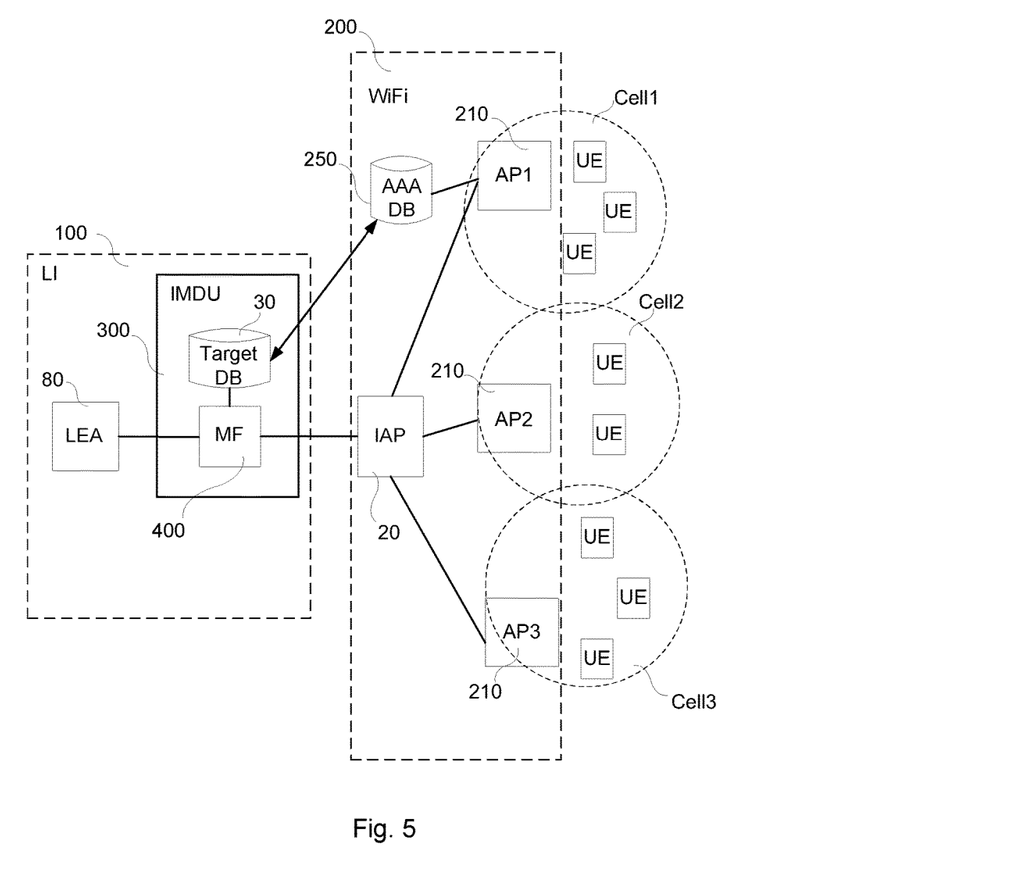
FIG. 5 is a block diagram illustrating an implementation of a mediation functionality node for supporting the described method.

FIG. 5 is a block diagram illustrating an implementation of a mediation functionality entity for supporting the described method.

The block diagram shows a LI system 100 and a WiFi network 200 sharing an Interception Access Point, IAP, 20, situated in the WiFi network.

The LI system in FIG. 5 is simplified for illustrating the blocks and units for implementing the presented method S100 and embodiments thereof. Thus, the LI system 100 also comprises some blocks and units as illustrated in FIG. 1 to be able to provide the LI services, but said blocks and units are not necessary to a person skilled in the art to understand how said the proposed method is implemented in a LI system. Thus, in the LI system of FIG. 5 is only the LEA 80 and the Intercept Mediation and Delivery Unit, IMDU, block 300 comprising the target DB 30 and the mediation function MF 400 illustrated. The mediation function entity 400 is connected to the target database 30. The LI system is connected to the IAP 20 in the WiFi network via an interface. The IAP 20 may comprise an ICE, Intercept Control Element (not shown), belonging to the LI system for intercepting the data communication traffic of subscribers/targets in the WiFi network.

The WiFi network comprises one or more Access Points 210, in the figure illustrated as AP1, AP2, and AP3. An IAP 20 is preferably connected to interfaces of the Access Points APs for intercepting the data communications traffic e.g. IP data packets, passing to or from the APs. Each AP is capable of covering an area denoted cell, wherein the AP and User Equipments of subscribers and targets are capable to establish connection via radio. The AP1 covers an area denoted Cell1, AP2 covers an area Cell2, . . . .

Thus, when a subscriber uses his or her user equipment, UE, to get access to a WiFi network and system, the UE sends a connection request. The request is received by a close Access Point, AP, of the WiFi network. During the access process between the UE and the WiFi network, an authentication of the subscriber is performed. The WiFi system sends an Accounting-Request message, as indicated in the signalling scheme of FIG. 2, to a node comprising a RADIUS server 250 for performing the authentication test. The RADIUS server comprises an AAA database, AAA DB, comprising information about an operator's subscribers. As the LI system 100 has registered to receive the RADIUS accounting messages for all the subscribers in the network, said Accounting-Request message is forwarded to the mediation functionality, MF, entity 400 in the IMDU 300 of the LI system. The IMDU 300 is thus configured by means of the MF 400 to support a method S100 as proposed herein for enabling the determination of targets' positions. The MF is adapted to perform steps S100, S120 and S130, and optionally step S115. The method S100 and an embodiment thereof is discussed and illustrated in this disclosure with reference to FIGS. 3 and 4.

As each Access Point 210 is identified by a unique RADIUS parameter retrieved from the Called-Station-Id field comprising WiFi Access Point Id and SSID or from the NAS-identifier comprising WiFi Access Point Id it is possible to identify each separate AP (AP1, AP2, AP3, . . . ).

The Access Point Identifier, can be set by means of a mnemonic code which is strictly correlated to the actual position of the Access Point, as example, it could be the corresponding to the actual position of the Access Point, e.g. the wgs84 coordinates of the AP, to which a target and its UE is connected for the moment.

By providing a meaningful Access Point Identifier over the HI interface, the proposed solution allows identifying the positioning of the target even in situations where the traditional positioning methods might be less efficient:

Indoor positioning, the Access Point identifier is regularly reported when the target is indoor. Furthermore since the Access Points density is much more higher compared to the outdoor cases this leads to a more accurate positioning information.

3D positioning, in many cases a Wi-Fi access network can cover different floors of a high building, the Access Point Identifier can reveal which is the floor where the target is currently attached.

Figure 6:
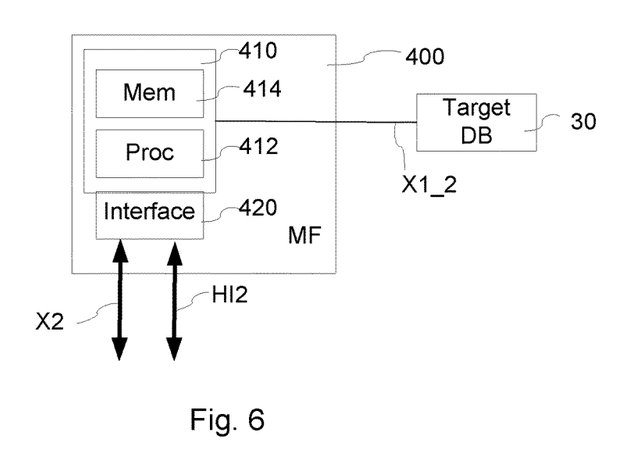
FIG. 6 is a block diagram illustrating one implementation of the mediation function.
Figure 7:
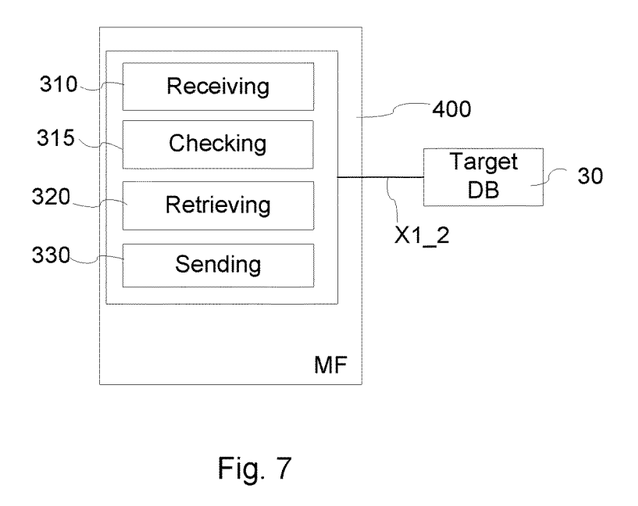
FIG. 7 is a block diagram illustrating another implementation of the mediation function.

Alternative implementation embodiments of the mediation function MF is illustrated in FIGS. 6 and 7.

FIG. 6 is a block diagram illustrating one implementation of the mediation function MF.

The mediation function entity 400 comprising a communication interface 420 and a processing unit 410. The processing unit 410 is connected to the interface 420 and an interface, e.g. X1_2, for communication with a target database 30. By means of the communication interface 420 is the mediation function capable of communicating over different interfaces of the LI system, e.g. X2 and HI2 (see also FIG. 1). Thus, the entity 400 may comprise the Delivery Function 2, DF2 (see FIG. 1). The processing unit 410 further comprises a programmable processor 412 and memory storage 414 for storing instruction code and data for running the processor 412. By means of the programmable processor 412 and memory storage 414 is the processing unit 410 adapted to:

receive RADIUS account message for a subscriber having been accepted access to the WiFi network;

retrieve from the received RADIUS account message RADIUS parameters corresponding to an Access Point Identifier and a Service Set Identifier, SSID, if the subscriber is a target;

send together with a target identification the RADIUS parameters corresponding to the Access Point Identifier and the SSID to the LEA.

The processing unit 410 may in one implementation be adapted to check by means of a target database if the subscriber is a target or not for accepting or discarding the RADIUS account message.

The RADIUS parameter may be retrieved from the Called-Station-Id field comprising WiFi Access Point Id and SSID, or retrieved from the NAS-identifier comprising WiFi Access Point Id.

The communication interface 420 and the processing unit 410 is further adapted to send the RADIUS parameters via the HI2 interface. The format of the RADIUS parameters may be modified in the MF before they are sent via the HI2 interface. One such format may be IRI.IRIContents AccessPointidentifier and IRI.IRIContents SSID.

FIG. 7 is a block diagram illustrating another implementation of the mediation function MF 400.

The mediation function MF 400 is connected a target database 30. According to this embodiment, the MF 400 comprises a receiving unit 310 to be able to receive RADIUS account message for a subscriber having been accepted access to the WiFi network and a checking unit 315 adapted to check by means of a target database if the subscriber is a target or not for accepting or discarding the RADIUS account message. The MF 400 may further comprise a processing unit 320 to be able to retrieve from the received RADIUS account message RADIUS parameters corresponding to an Access Point Identifier and a Service Set Identifier, SSID, if the subscriber is a target. In addition, a sender unit 330 is provided to enable for the MF 400 to send together with a target identification the RADIUS parameters corresponding to the Access Point Identifier and the SSID to the LEA.

The receiving unit 310 and sender unit 330 may be implemented as a communication interface by means of software and/or hardware circuitry. The checking unit 315 and processing unit 320 may be implemented by means of a programmable processor and software program. The checking unit 315 is optional, if the discarding or acceptance of account messages is solved in another way, e.g. in another entity than in the MF entity.

The entities, blocks and units described above with reference to FIGS. 5, 6, and 7 are logical units, and do not necessarily correspond to separate physical units. Thus, the person skilled in the art would appreciate that the units disclosed in the FIGS. 5, 6 and 7 may be implemented as physically integrated units, and/or physically separate units, and that the units are provided with appropriate processing circuits.

The above described technology imply a number of more or less obvious advantages to different users of lawful interception systems, e.g. manufactures, operators, LEAs, etc.

One of the advantages is that the proposed solution is not requiring any change in the IAPs of the network, the functionality is fully allocated in the LI System which exploits standard mechanism, like the subscription to the accounting interface for retrieving the needed information. Since the networks are very often multivendor, by having a LI solution which is not locked-in on a specific IAP implementation, it is a clear advantage.

The telecom operators have started commercially deploying Wi-Fi offload and Voice over Wi-Fi, in some countries. They may be requested by the national LEA to provide a solution for positioning the target connected via Wi-Fi. One advantage is that the proposed solution is not making use of any special additional instrument and it might be very attractive to them.

In many countries the telecom operators have a price list for the LI premium functionalities, beyond the national legal obligation. In that perspective the Provision of trustable solution for indoor positioning and 3D positioning might increase their revenues from LI.

LEA will be provided with the means for identifying quite accurately the position of targets connected via Wi-Fi.

Indoor and 3D position is a plus which is also attractive to a LEA. Especially when the Wi-Fi access network is deployed in very high buildings in the city centres. In such cases by identifying the target's floor in a 50-storey building makes the difference in the investigations.

A number of embodiments of the present technique have been described. It will be understood that various modifications may be made without departing from the the proposed method and entity. Therefore, other implementations are within the scope of the following claims.

ABBREVIATION LIST

3GPP Third Generation Partnership Project
LTE Long Term Evolution
GSM Global System for Mobile Communications
GPS Global Positioning System
PS Packet Switched
CS Circuit Switched
SIM Subscriber Identity Module
U-SIM UMTS SIM
UMTS Universal Mobile Telecommunications System
TLS Transport Layer Security Protocol
TTLS Tunnelled TLS
HI Handover Interface
LI Lawful Intercept(-ion)
DF Delivery Function
MF Mediation Function
LEMF Law Enforcement Monitoring Facility
ADMF Administration Function
LEA Law Enforcement Agency
IP Internet Protocol
LAN Local Area Network
WLAN Wireless LAN

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover interface for Lawful Interception" (Release 8);

The invention claimed is:

1. A method performed by a mediation function entity for enabling a Law Enforcement Agency (LEA) to determine targets' positions, said targets are connected to a WiFi network via Access Points, the method comprises steps of:
   the mediation function entity receiving a first Remote Authentication Dial-In User Service (RADIUS) account message for a first subscriber having been accepted access to the WiFi network via a first Access Point, wherein the mediation function entity is in a Lawful Intercept (LI) system;
   the mediation function entity receiving a second RADIUS account message for a second subscriber having been accepted access to the WiFi network via a second Access Point;
   the mediation function entity determining whether at least one of the first subscriber and the second subscriber is a target;
   as a result of determining that the first subscriber is a target, the mediation function entity retrieving from the received first RADIUS account message RADIUS parameters corresponding to an Access Point Identifier and a Service Set Identifier (SSID);
   the mediation function entity sending, to the LEA, a target identification for the first subscriber and the retrieved RADIUS parameters corresponding to the Access Point Identifier and the SSID; and
   as a result of determining that the second subscriber is not a target, the mediation function entity discarding the second RADIUS account message.

2. The method according to claim 1, wherein determining whether at least one of the first subscriber and the second subscriber is a target comprises:
   checking a target database to determine whether at least one of the first subscriber and the second subscriber is a target.

3. The method according to claim 1, wherein at least one RADIUS parameter is retrieved from a Called-Station-Id field comprising the Access Point identifier and the SSID.

4. The method according to claim 1, wherein at least one RADIUS parameter is retrieved from a Network Access Server identifier (NAS-identifier) comprising the Access Point identifier.

5. The method according to claim 1, wherein the sending step comprises sending the RADIUS parameters via a handover interface, wherein the handover interface is a handover interface 2 (HI2) interface.

6. The method according to claim 5, wherein the RADIUS parameters are sent via the HI2 interface as an Intercept Related Information (IRI) identifier and a IRI SSID, wherein a format for the IRI identifier is IRI.IRIContents Access-Pointidentifier and a format for the IRI SSID is IRI.IRIContents SSID.

7. A mediation function entity for enabling a Law Enforcement Agency (LEA) to determine targets' positions, said targets are connected to a WiFi network via Access Points, the mediation function entity comprising a communication interface and a processing unit being adapted to:

receive a Remote Authentication Dial-In User Service (RADIUS) account message for a first subscriber having been accepted access to the WiFi network via a first Access Point, wherein the mediation function entity is in a Lawful Intercept (LI) system;

receive a second RADIUS account message for a second subscriber having been accepted to the WiFi network via a second Access Point;

determine whether at least one of the first subscriber and the second subscriber is a target;

as a result of determining that the first subscriber is a target, retrieve from the received first RADIUS account message RADIUS parameters corresponding to an Access Point Identifier and a Service Set Identifier (SSID);

send, to the LEA, a target identification for the first subscriber and the retrieved RADIUS parameters corresponding to the Access Point Identifier and the SSID; and as a result of determining that the second subscriber is not a target, discard the second RADIUS account message.

8. The mediation function entity according to claim 7, wherein determining whether at least one of the first subscriber and the second subscriber is a target comprises:

check a target database to determine whether at least one of the first subscriber and the second subscriber is a target.

9. The mediation function entity according to claim 7, wherein at least one RADIUS parameter is retrieved from a Called-Station-Id field comprising the Access Point identifier and the SSID.

10. The mediation function entity according to claim 7, wherein at least one RADIUS parameter is retrieved from a Network Access Server identifier (NAS-identifier) comprising the Access Point identifier.

11. The mediation function entity according to claim 7, wherein the communication interface and the processing unit further are adapted to send the RADIUS parameters via a handover interface, wherein the handover interface is a handover interface 2 (HI2) interface.

12. The mediation function entity according to claim 11, wherein the RADIUS parameters are sent via the HI2 interface as an Intercept Related Information (IRI) identifier and a IRI SSID, wherein a format for the IRI identifier is IRI.IRIContents AccessPointidentifier and a format for the IRI SSID is IRI.IRIContents SSID.

* * * * *